(12) United States Patent
Ryan (10) Patent No.: US 7,065,036 B1
(45) Date of Patent: Jun. 20, 2006

(54) METHOD AND APPARATUS TO REDUCE LATENCY IN A DATA NETWORK WIRELESS RADIO RECEIVER

(75) Inventor: Philip J. Ryan, Stanmore (AU)

(73) Assignee: Cisco Systems Wireless Networking (Australia) Pty Limited, North Sydney (AU)

(*) Notice: Subject to any disclaimer, the term of this patent is extended or adjusted under 35 U.S.C. 154(b) by 1010 days.

(21) Appl. No.: 10/096,010

(22) Filed: Mar. 11, 2002

Related U.S. Application Data (60) Provisional application No. 60/322,414, filed on Sep. 14, 2001, provisional application No. 60/283,609, filed on Apr. 13, 2001, provisional application No. 60/277,370, filed on Mar. 19, 2001.

(51) Int. Cl.
*H04Q 7/24* (2006.01)

(52) U.S. Cl. .................................... 370/208; 370/338

(58) Field of Classification Search ................ 370/208, 370/210, 338, 474
See application file for complete search history.

(56) References Cited

U.S. PATENT DOCUMENTS

| | | | | |
|---|---|---|---|---|
| 5,537,435 A | * | 7/1996 | Carney et al. | ............... 375/219 |
| 5,790,615 A | * | 8/1998 | Beale et al. | ................ 375/376 |
| 6,631,143 B1 | * | 10/2003 | Karim | ......................... 370/514 |

* cited by examiner

*Primary Examiner*—Derrick Ferris
(74) *Attorney, Agent, or Firm*—Dov Rosenfeld; Inventek (57) ABSTRACT

A radio receiver for implementing the physical layer receiving function (PHY) of a wireless data network includes a receive processing pipeline for processing samples of a received packet of data. The samples enter the receive processing pipeline at a first sample rate. A counter generates a running count indicative of the number of samples that have entered the processing pipeline. A comparison unit coupled to the counter determines from the running count if all the samples of the received packet have entered the pipeline. An output of the comparison unit indicates whether or not all samples have entered the pipeline. A clock unit coupled to the comparison unit output provides a clock signal to the pipeline, causing the processing pipeline to process the samples entering the pipeline at a first rate compatible with the first sample rate until the comparison unit output indicates that all samples have entered the pipeline. Thereafter the clock unit causes the processing pipeline to process the samples in the pipeline at a second rate higher than the first rate until the last sample of the packet has been output by the pipeline. The processing latency for processing the complete packet is thus reduced from the case of the processing pipeline processing the samples all at the first data rate.

29 Claims, 4 Drawing Sheets

METHOD AND APPARATUS TO REDUCE LATENCY IN A DATA NETWORK WIRELESS RADIO RECEIVER

RELATED PATENT APPLICATIONS

This invention claims priority of the following U.S. provisional patent applications:

Ser. No. 60/277,370, titled SYSTEM USING SINGLE CHIP WIRELESS LAN MODEM AND SINGLE CHIP RADIO TRANSCEIVER AND APPARATI, METHODS, AND SOFTWARE PRODUCTS USED THEREIN OR THEREWITH, filed: Mar. 19, 2001.

Ser. No. 60/283,609, titled WIRELESS COMMUNICATION SYSTEM, filed: Apr. 13, 2001.

Ser. No. 60/322,414, titled METHOD AND APPARATUS TO REDUCE-LATENCY INA DATA NETWORK WIRELESS RADIO RECEIVER, filed: Sep. 14, 2001.

Such provisional patent applications are incorporated herein by reference.

This invention is related to U.S. provisional patent application Ser. No. 60/322,415, titled ADAPTIVE VITERBI DECODER FOR A WIRELESS DATA NETWORK RECEIVER to Keaney, et al, filed Sep. 14, 2001. Patent application Ser. No. 60/322,415 is incorporated herein by reference.

BACKGROUND

This invention is related to wireless devices, and in particular to an apparatus and method to reduce the processing latency in a wireless data network receiver.

Wireless technology is well known and widely used. Networks, such as local area networks are also well known and commonly used. Recently, there has been a lot of effort to implement wireless data networks, in particular wireless local area networks (WLANs). There is a desire to make these networks faster and faster.

John D. O'Sullivan, et al., describe portable computer wireless local area network devices that operate in excess of 10 GHz in U.S. Pat. No. 5,487,069, issued Jan. 23, 1996, (herein "O'Sullivan '069"). One object of such devices is to allow portable computer users to access the enterprise's LAN untethered and from any location in several buildings on a campus. A method of converting data into symbols that are used to modulate the radio carrier is offered by O'Sullivan '069 to overcome the problems inherent in spread spectrum systems. The use of symbols establishes many parallel sub-channels that each has modulation periods much longer that any multipath delays that might confuse demodulation. Such Patent is incorporated herein by reference. In effect, O'Sullivan '069 describe the basic coded orthogonal frequency division multiplexing (COFDM) called for in the recently adopted IEEE-802.11a wireless LAN standard.

Carrier frequencies in the ultra-high frequency (UHF) radio bands and above can naturally carry very high modulation rates, so more data bandwidth is inherently available.

A typical radio receiver/transmitter (transceiver) and modulator/demodulator (modem) together implement the functions of the physical layer of a network. The modem is coupled to a media access controller (MAC) that provides the next highest level functions in a layered network model. Because of the high data rate, the modem must pass information to the MAC about packets very fast. Thus, the IEEE 802.11a standard and similar high-speed wireless data network specifications require that the receive processing latency must be very small. The receive processing latency is defined as the time from when the RF energy finishes on the channel, to when the last byte of data in that packet is demodulated and passed to the MAC. In the IEEE 802.11a standard, the receive processing latency must be less than 12 microseconds. This is a stringent requirement.

The strict receive processing latency requirement is sometimes at odds with other requirements of a data network standard such as the IEEE 802.11a standard. For example, this standard provides for various data rates, and the higher data rates use a higher level of coding and more complex modulation such as 64-QAM. Demodulating and decoding such high rate information requires more processing that typically takes longer, thus further complicating meeting the strict receive processing latency requirement.

There thus is a need for an apparatus and method that reduces the receive processing latency in a radio receiver, in particular, a radio receiver for a data network.

For more information on the IEEE 802.11 and IEEE 802.11a standards, see: ANSI/IEEE Std 802.11, 1999 Edition (ISO/IEC 8802-11:1999) Local and metropolitan area networks—Specific Requirements—Part 11: Wireless LAN Medium Access Control (MAC) and Physical Layer (PHY) Specifications, and IEEE Std 802.11a-1999 [ISO/IEC 8802-11:1999/Amd 1:2000(E)] (Supplement to IEEE Std 802.11, 1999 Edition) Part 11: Wireless LAN Medium Access Control (MAC) and Physical Layer (PHY) specifications: High-speed Physical Layer in the 5 GHz Band. The standards are available on the Internet at several locations, including from the IEEE (http://www.IEEE.org) and in particular at http://grouper.ieee.org/groups/802/11/index.html.

SUMMARY

A radio receiver for implementing the physical layer receiving function (PHY) of a wireless data network includes a receive processing pipeline for processing samples of a received packet of data. The samples enter the receive processing pipeline at a first sample rate. A counter generates a running count indicative of the number of samples that have entered the processing pipeline. A comparison unit coupled to the counter determines from the running count if all the samples of the received packet have entered the pipeline. An output of the comparison unit indicates whether or not all samples have entered the pipeline. A clock unit coupled to the comparison unit output provides a clock signal to the pipeline, causing the processing pipeline to process the samples entering the pipeline at a first rate compatible with the first sample rate until the comparison unit output indicates that all samples have entered the pipeline. Thereafter the clock unit causes the processing pipeline to process the samples in the pipeline at a second rate higher than the first rate until the last sample of the packet has been output by the pipeline. The processing latency for processing the complete packet is thus reduced from the case of the processing pipeline processing the samples all at the first data rate.

Other aspects, features, and advantages will be clear from the detailed description.

DETAILED DESCRIPTION

Figure 1:
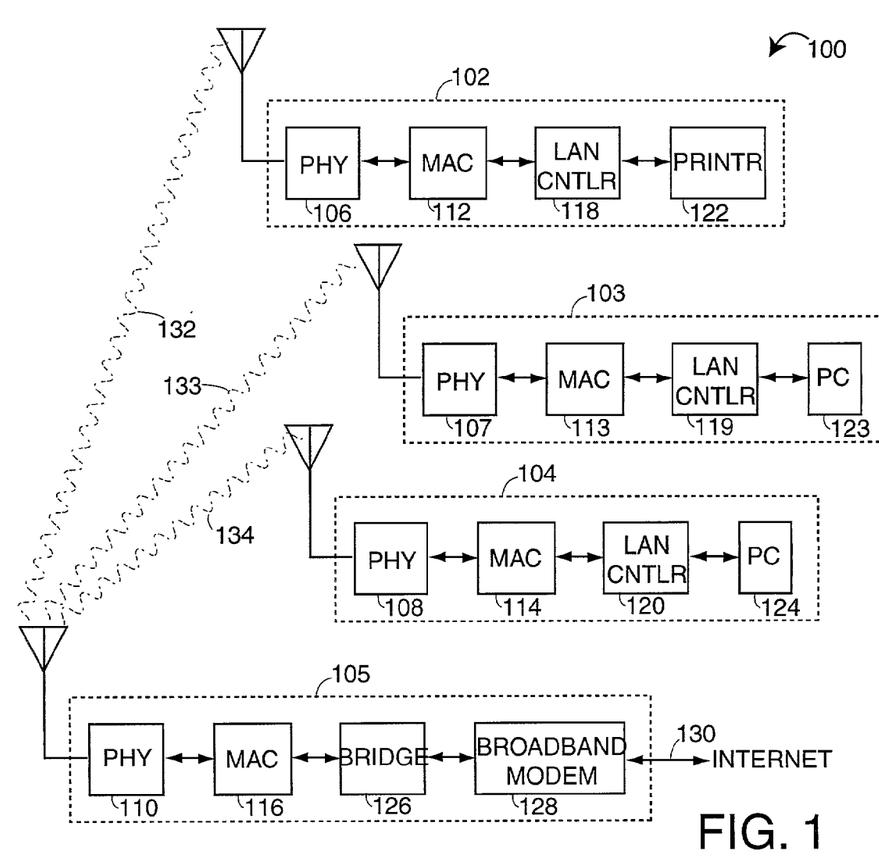
FIG. 1 is a functional block diagram of a wireless communication system embodiment of the present invention.

FIG. 1 diagrams a wireless computer data network in which embodiments of the present invention may be used, and is referred to herein by the general reference numeral 100. The network 100 includes a plurality of wireless appliances represented by units 102, 103 and 104, and may also include at least one access point, e.g., a base station connected to the Internet, e.g., represented here by a base station 105. The wireless appliances may be mobile or fixed. Network 100 preferably operates according to industry networking standards. For example, the IEEE-802.11 standards define protocols for two types of networks, ad hoc and infrastructure networks. An ad hoc network is a simple network where communication between any two stations is established directly between the two stations without the use of an access point. For such networks, standards specify the etiquette that each station must observe so that they all have fair access to the wireless medium, and provide methods for arbitrating requests to use the medium to ensure that throughput is maximized for all of the users in the WLAN. An infrastructure network uses an access point for allocating the transmit time for all stations. Communication between any two stations is established via the access point. The access point further is used to handle traffic from any station to the wired or wireless backbone of the wider network, e.g., an intranet or the Internet. This arrangement allows for coordination of all of the stations in the basic service area and ensures proper handling of the data traffic. Typically, infrastructure wireless local area networks (WLANs) provide better throughput performance than ad hoc networks, and also provide greater scalability.

The license-free national information structure (U-NII) radio spectrum bands in the United States are assigned to 5.15–5.25, 5.25–5.35, and 5.725–5.825 GHz, and are preferred for use in the network 100 for wireless ad hoc LAN communication. The IEEE-802.11a protocol is for operation in these bands, and includes a training sequence built on a preamble that provides sufficient information to allow frequency and timing estimation as well as channel estimation to enable a receiver to lock-on to the carrier and allow data demodulation. All transmissions occur in bursts, so the receivers must find lock each time a burst commences.

A physical layer interface (PHY) 106, 107, 108, and 110, provides each of the wireless interconnections. A media access controller (MAC) 112, 113, 114, and 116, provide the next interface layer in a layered communications model. A local area network controller 118, 119, and 120 is provided as a peripheral to a personal computer (PC) 123, 124 and, in this example, a printer 122. The PCs can, for example be computer workstations and laptops that belong to employees in a business environment, and even to individuals in their homes. In one application, the base station 105 is installed in a hotel and the other units 103 and 104 are independent guests who have checked-in and are allowed to access the Internet as part of their room charges. Unit 102 can be a printer.

A bridge 126 interfaces the local area network through a broadband modem 128 to the Internet 130. The broadband modem 128 can be implemented with DSL, ISDN, or even two-way satellite connections like Starband (www.starband.com).

A plurality of radio communications, represented by radio links 132, 133, and 134, preferably use forty-eight active tones and four pilot tones in a 64-tone FFT coded orthogonal frequency division multiplexing (COFDM), and one of a set of allowable modulation schemes, for example quadrature phase shift keying (QPSK). The modulated signals are transmitted in the five GHz frequency band. Other modulation schemes include binary phase shift keying (BPSK), 16QAM and 64QAM. Such are described in detail in the IEEE-802.11a standard (www.ieee.com). Note that in an ad hoc network there are direct radio links between the units 122, 123, and 124.

Figure 2:
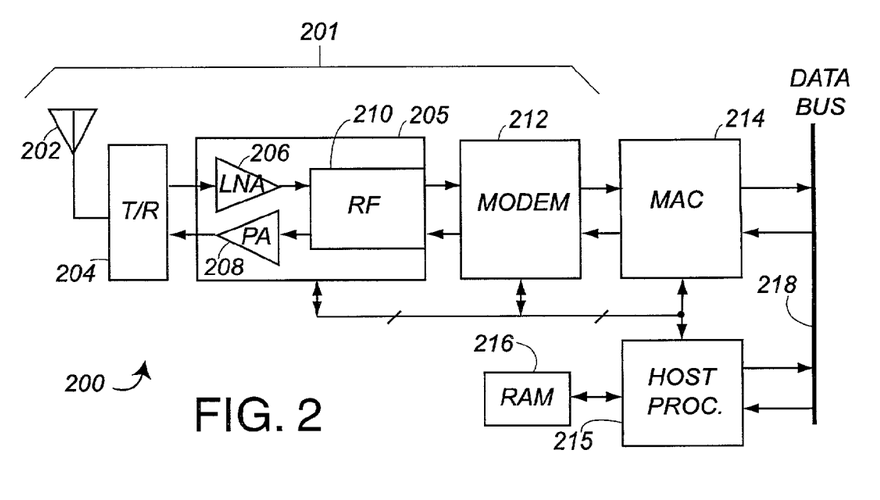
FIG. 2 is a functional block diagram of a wireless communication system 200 that includes an embodiment of the present invention.

FIG. 2 is a functional block diagram of a wireless communication system 200 that includes an embodiment of the present invention. The system 200 might be, for example, part of a PCMCIA wireless LAN card embodiment, and includes a physical layer interface (PHY) 201 that includes at least one antenna 202 for 5 G Hz carrier service, a transmit/receive (T/R) switch 204 for half-duplex operation, and a wireless transceiver 205 such as that of FIG. 2 that includes a low-noise amplifier (LNA) 206, a power amplifier (PA) 208, and other radio frequency (RF) transceiver components (210) as described herein. On embodiment includes antenna diversity. The physical layer also includes a data modem 212. The system 200 further includes a media access controller (MAC) 214 for layer-2 processing. A computer system databus 218 is accommodated. Interfaces may be included e.g., one or more interfaces that conform to well-known industry standards PCMCIA, PCI, USB, and so forth.

One optional component is a host processor 215. The host processor function, for example, may be incorporated with the MAC 214. A random access memory (RAM) 216 is included for data buffering and program storage. The RAM 216 may be directly coupled to the host or to the MAC or to both.

In addition to the radio data between the modem, radio transceiver, and MAC, control information such as gain settings for the radio receiver from an automatic gain control module in the modem, and other data, may be communicated between the host (if included), the MAC, the modem and the wireless transceiver.

In one embodiment, the system 200 is implemented to be compatible with the IEEE-802.11a standard for wireless local area network applications. The RF transceiver 205 and modem 212 constitute a complete wireless engine for OSI Layer-1 physical layer (PHY) functionality in broadband wireless LAN's. The MAC 214 is IEEE-802.11-compliant for layer-2 processing. Supportable data rates have been tested to exceed 54 Mbits/second.

Given the present state of semiconductor technology development, the system 200 is preferably constructed on a single printed circuit board (PCB) and the RF transceiver 210 and modem 212 are each implemented with CMOS technology in individual integrated circuits. The present inventors have discovered that 0.25-micron CMOS technology is practical for use in implementations of the modem 212, and 0.18-micron CMOS technology for the RF transceiver. One such silicon foundry that has the capability to manufacture such parts is Taiwan Semiconductor Manufacturing Co., Ltd.

The Modem Chip

Figure 3:
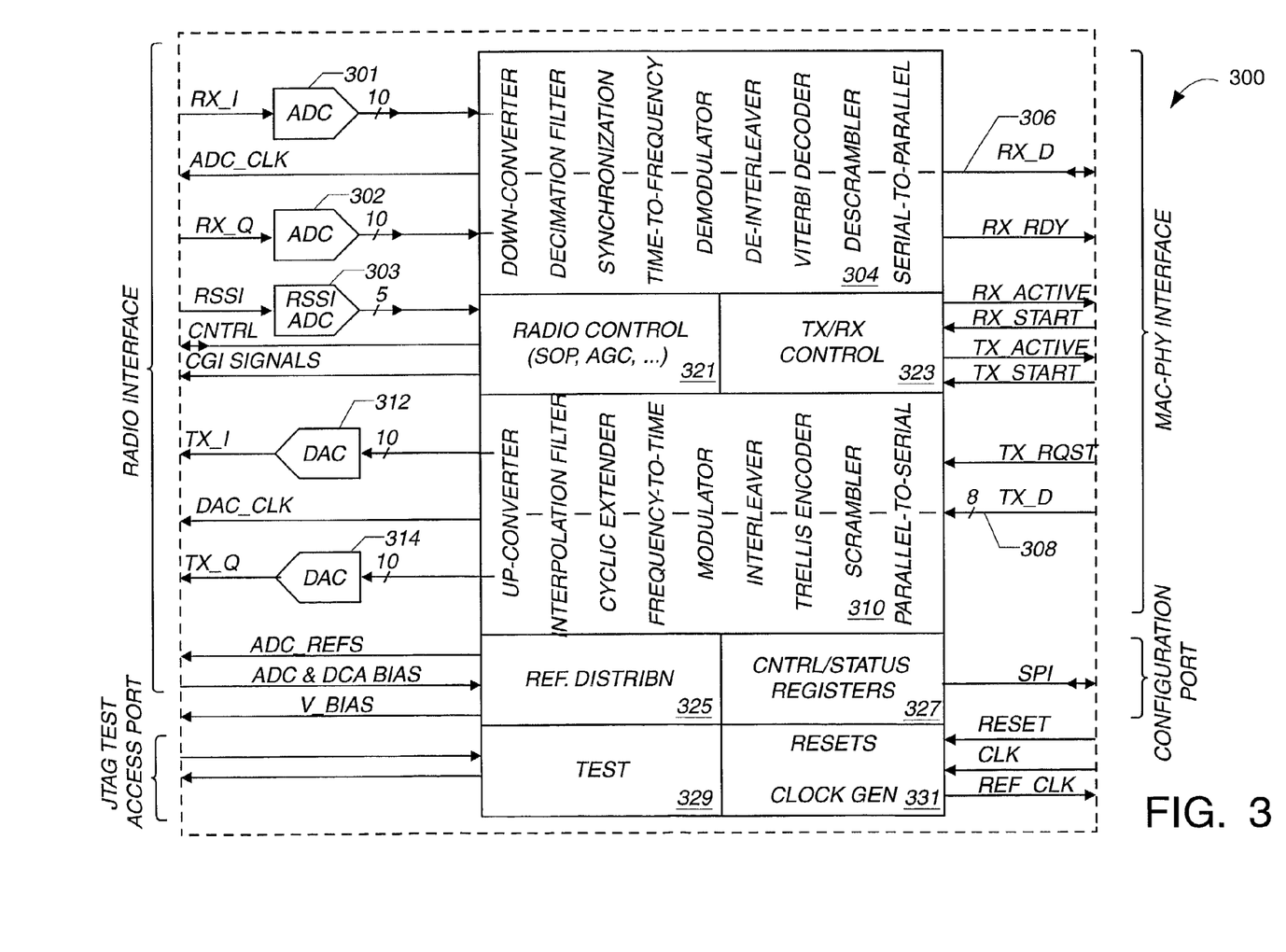
FIG. 3 shows a block diagram of a modem integrated circuit that includes an embodiment of the present invention.

FIG. 3 shows in simplified block diagram form, an embodiment 300 of the modem chip that can operate with the transceiver 205 and that includes an embodiment of the present invention. ADCs 301 and 302 accept fully differential I and Q analog signals from one embodiment of the transceiver, or one of the ADCs accepts a single differential signal from a single sideband embodiment of the transceiver. The receive signal processor 304 accepts the digitized receive signals from ADCs 301 and 302 and carries out the following operations: down-conversion, anti-alias filtering, OFDM symbol synchronization, time-to-frequency conversion, sub-carrier demodulation, de-interleaving, the inventive Viterbi decoding, descrambling, and serial-to-parallel conversion. The output 306 of the receive processor 304 goes to an off-chip MAC processor.

The receive input of modem 300 can interface to two basic receiver configurations.

1. A quadrature radio receiver with baseband I and Q differential outputs that are sampled at 40Ms/s by the ADCs. In such a case the ADC outputs are filtered by 2:1 decimating filters in the receiver signal processor 304.
2. A bandpass IF radio receiver with real bandpass IF differential output centered at 20 MHz. The analog input from the transceiver 205 is sampled at 80Ms/s by one ADC and an internal IQ down-converter in processor 304 generates baseband I and Q channel outputs. The decimating filters are configured as a 4:1 decimating low-pass filters.

In one embodiment, the transmit and receive data paths in modem 300 are completely independent, allowing full-duplex as well as half-duplex operation.

Note that one embodiment of the modem chip is only for implementation with a bandpass IF radio receiver, so that only a single differential ADC, rather than the two ADCs 301 and 302 shown in FIG. 6 is included for the receive path. The analog input from the transceiver 205 is sampled at 80Ms/s by that ADC and an internal IQ down-converter with decimation filters in processor 304 generates baseband I and Q channel outputs. The decimating filters are configured as a 4:1 decimating low-pass filters.

The to-be-transmitted signal 308 from the MAC is input to a transmit processor 310 that performs parallel-to-serial conversion, scrambling, encoding, bit-interleaving, sub-carrier modulation, OFDM time symbol generation, cyclic extension, filtering and up-conversion. The resulting digital signals are converted to analog I- and Q-signals by digital-to-analog converters 312 and 314. These analog signals are input to the transceiver 205.

The architecture shown in FIG. 3 supports all the raw data rates and modulation schemes specified by IEEE 802.11a, mandatory and optional, plus three additional proprietary configurations.

In one embodiment, operation of the modem 300 is controlled and monitored by a set of 48 16-bit control and status registers that are accessed via a 4-pin Serial Peripheral Interface (modem SPI).

The radio receiver is controlled by radio control block 321 that includes start-of-packet (SOP) detection and automatic gain control (AGC) for dynamically setting the gains and the performance of the transceiver. The SOP and AGC functions may be as described in U.S. provisional patent application 60/322,382 filed Sep. 14, 2001, titled AUTOMATIC GAIN CONTROL AND LOW POWER START-OF-PACKET DETECTION FOR A WIRELESS LAN RECEIVER to inventors Ryan et al., and assigned to the assignee of the present invention. An alternate method is described in U.S. provisional patent application Ser. No. 60/354,344, titled AUTOMATIC GAIN CONTROL AND START-OF-PACKET DETECTION FOR A WIRELESS LAN RECEIVER, also to Ryan et al. The receive and transmit functions of the modem are controlled by an RX/TX control block 323 that both provides controlling the function of the modem under control of the off-chip MAC controller and that provides control signals to the off-chip MAC controller.

The modem also includes a modem gain control interface (modem GCI) in radio control 321 that outputs gain parameters to a radio receiver. The gain control interface is a serial transmit-only port for setting gains, used, for example, to dynamically adjust transceiver receive path gain to optimize the received signal to noise ratio. In one embodiment, the GCI also provides a mechanism for controlling the transmit power level of a radio transmitter connected to the modem by selecting from one of nine configurations for the power amplifier of the transmitter. The modem GCI functions with a receive-only transceiver GCI that is in the transceiver 205.

In order to keep the power consumption of the modem chip low, the analog-to-digital converters are only kept on when necessary. Thus there are RUN/STANDBY signals for each of the ADCs 301 and 302. Furthermore, there are controlled bias circuits for the analog components of the modem chip that provide for switching bias currents on and off from different subsections of the modem chip, and that also provide for switching the bias current from a first level to a second level.

The functions of the modem of FIG. 3 are controlled by several finite state machines (FSMs). In one embodiment, a 16-bit microcontroller also is included.

The OFDM Packet

Figure 4:
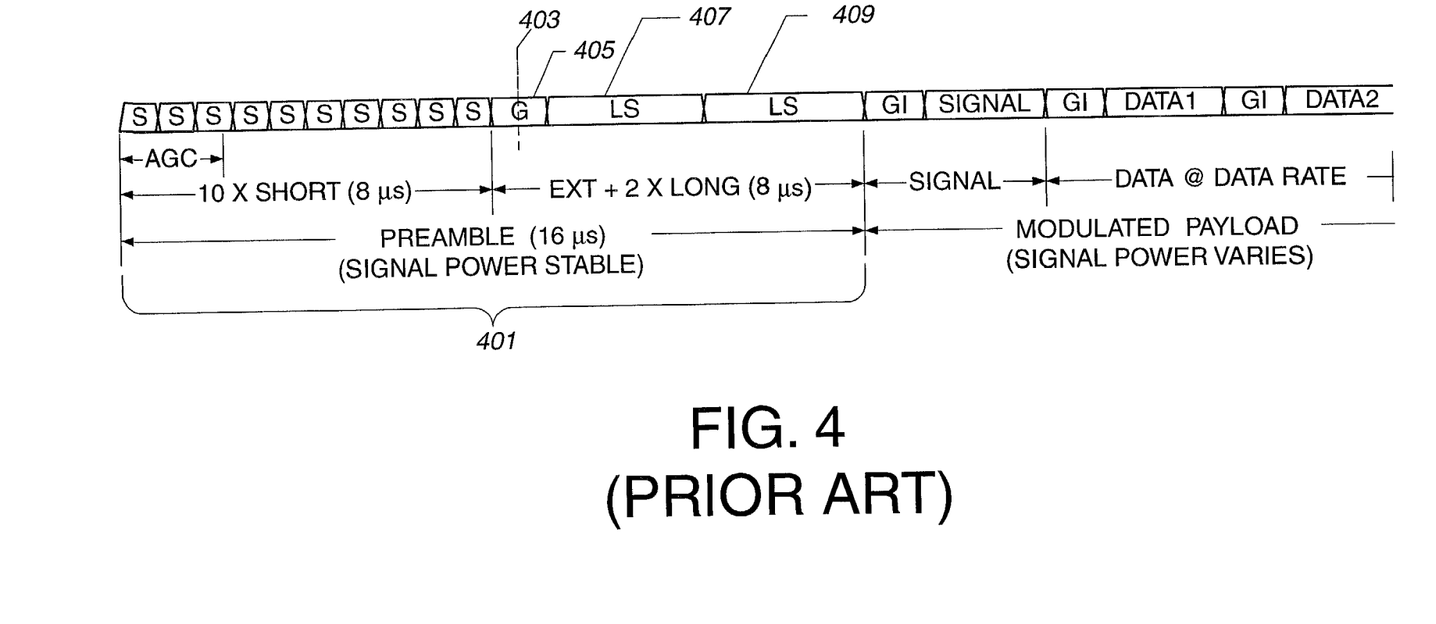
FIG. 4 shows an OFDM packet as occurs with the 802.11a standard.

FIG. 4 shows the structure of an OFDM packet as used in IEEE 802.11a WLANs. The packet starts with a preamble 401 used for SOP detection, AGC, diversity selection when diversity is used, and various other synchronization functions. The preamble is followed by the modulated payload, which starts with a known (low) data rate SIGNAL field and DATA fields. The SIGNAL field includes information on the coding and the data rate of the data. Each DATA field also includes a guard interval GI (cyclic extension) to make up a data frame of the packet.

The following describes a typical transmit sequence process for generating data packets such as that of FIG. 4 that conform to the IEEE 802.11a standard. The generated packets for transmission:

(a) Produce the physical layer convergence protocol (PLCP) preamble field, composed of 10 repetitions of a "short training sequence" (used for AGC convergence, diversity selection, timing acquisition, and coarse frequency acquisition in the receiver) and two repetitions of a "long training sequence" (used for channel estimation and fine frequency acquisition in the receiver), preceded by a guard interval (GI).

(b) Produce the PLCP header field using RATE, LENGTH, and SERVICE information by filling the appropriate bit fields in the header. The allowed values for the LENGTH parameter are in the range of 1–4095. This parameter is used to indicate the number of octets in the MAC protocol data unit (MPDU) which the MAC is currently requesting the PHY to transmit. This value is used by the PHY to determine the number of octet transfers that will occur between the MAC and the PHY after receiving a request to start the transmission. The DATARATE parameter describes the bit rate at which the PLCP shall transmit the PLCP service data unit (PSDU). Its value can be any of the rates 6, 9, 12, 18, 24, 36, 48, or 54 Mbits/sec. Support for data rates of 6, 12, and 24 are mandatory. The SERVICE parameter consists of 7 null bits used for the scrambler initialization and 9 null bits reserved for future use. The RATE and LENGTH fields of the PLCP header are encoded by a convolutional code at a rate of R=1/2, and are subsequently mapped onto a single BPSK encoded OFDM symbol, denoted as the SIGNAL symbol (see FIG. 4). The encoding of the SIGNAL field into an OFDM symbol follows the same steps for convolutional encoding, interleaving, BPSK modulation, pilot insertion, Fourier transform, and prepending a GI as described subsequently for data transmission at 6 Mbit/s (Mbps). The contents of the SIGNAL field are not scrambled.

(c) Calculate from RATE field the number of data bits per OFDM symbol ($N_{DBPS}$), the coding rate (R), the number of bits in each OFDM subcarrier ($N_{BPSC}$), and the number of coded bits per OFDM symbol ($N_{CBPS}$).

(d) Append the PSDU to the SERVICE field. Extend the resulting bit string with "zero" bits (at least 6 bits) so that the resulting length will be a multiple of $N_{DBPS}$.

(e) Initiate the scrambler with a pseudo-random non-zero seed, generate a scrambling sequence, and XOR it with the extended string of data bits.

(f) Replace the six scrambled "zero" bits following the "data" with six nonscrambled "zero" bits. Those bits return the convolutional encoder to the "zero state" and are denoted as "tail bits."

(g) Encode the extended, scrambled data string with a convolutional encoder (R=1/2). Omit some of the encoder output string to reach the desired "coding rate." That is, "puncture" according to a "puncturing pattern." Puncturing is known as a procedure for omitting some of the encoded bits in the transmitter, thus reducing the number of transmitted bits and increasing the coding rate, and inserting a dummy "zero" metric into the convolutional decoder on the receive side in place of the omitted bits. While not required, decoding by the Viterbi algorithm is recommended.

(h) Divide the encoded bit string into groups of N CBPS bits. Within each group, perform an "interleaving" (reordering) of the bits according to a rule corresponding to the desired RATE.

(i) Divide the resulting coded and interleaved data string into groups of $N_{CBPS}$ bits. For each of the bit groups, convert the bit group into a complex number according to the modulation encoding tables.

(j) Divide the complex number string into groups of 48 complex numbers. Each such group will be associated with one OFDM symbol. In each group, the complex numbers will be numbered 0 to 47 and mapped hereafter into OFDM subcarriers numbered −26 to −22, −20 to −8, −6 to −1, 1 to 6, 8 to 20, and 22 to 26, respectively. The subcarriers −21, −7, 7, and 21 are skipped and, subsequently, used for inserting pilot subcarriers. The "0" subcarrier, associated with center frequency, is omitted and filled with zero value.

(k) Insert four subcarriers as pilots into positions −21, −7, 7, and 21. The total number of the sub-carriers is 52 (48+4).

(l) For each group of subcarriers −26 to 26, convert the subcarriers to time domain using the inverse discrete Fourier transform implemented for example using the inverse FFT. Prepend to the Fourier-transformed waveform a circular extension of itself thus forming a GI, and truncate the resulting periodic waveform to a single OFDM symbol length by applying time domain windowing.

(m) Append the OFDM symbols one after another, starting after the SIGNAL symbol describing the RATE and LENGTH.

(n) Up-convert the resulting "complex baseband" waveform to an RF frequency according to the center frequency of the desired channel and transmit.

The Receive Chain

Figure 5:
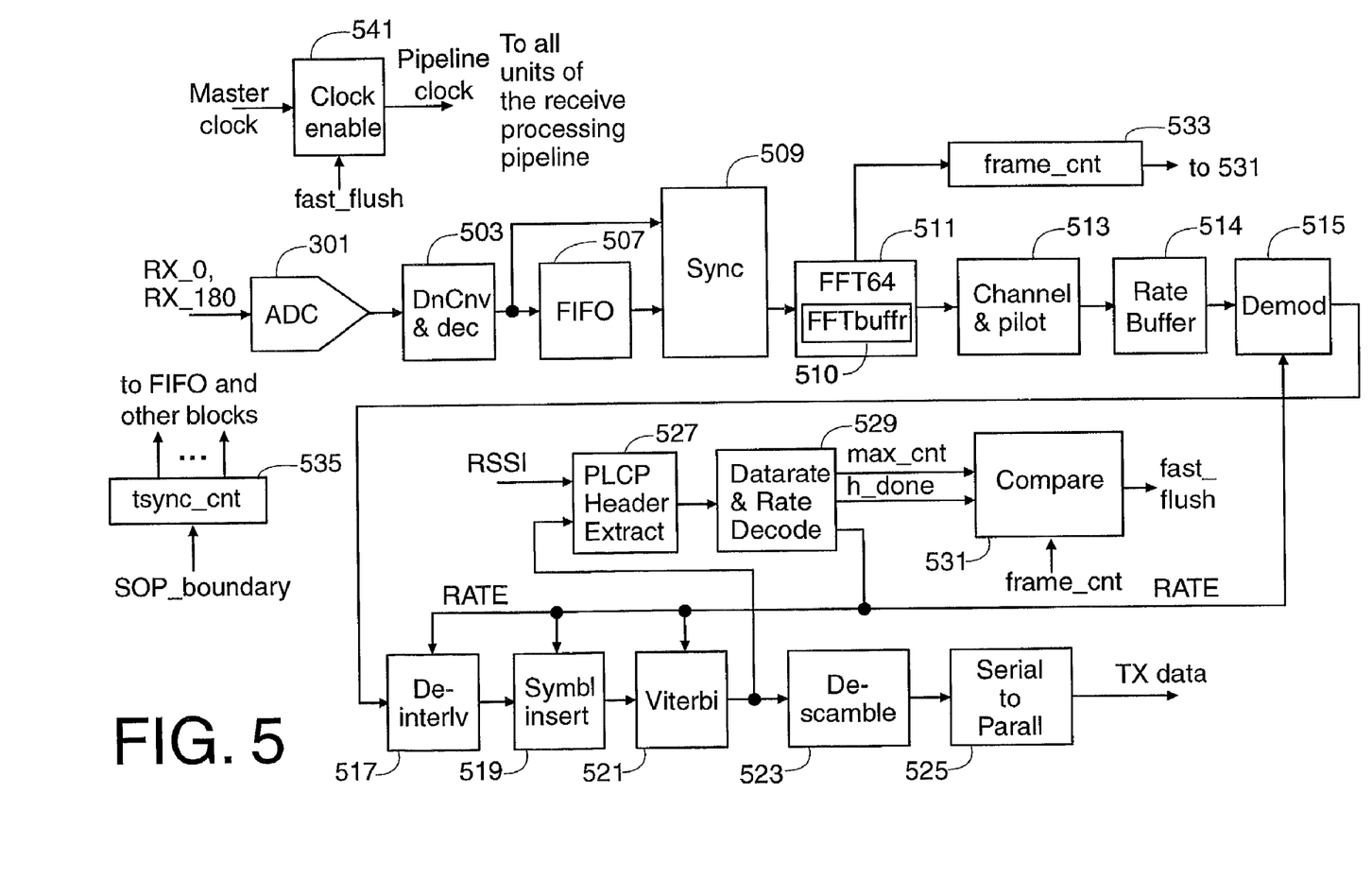
FIG. 5 shows a simplified block diagram of the receive processing chain of the modem in accordance with one embodiment of the invention.

FIG. 5 shows a simplified block diagram of the receive chain of the modem embodiment of FIG. 3. The processing blocks form elements of a receive processing pipeline. After sampling and decimation (block 503) by ADC 301, I and Q samples enter the pipeline at 20 Msamples/sec into first-in-first-out buffer (FIFO) 507 implemented as a delay line, and also into the time synchronization unit 509. The FIFO is a standard FIFO except that the output IQ samples may be taken from several selected points within the buffer, and may also be read out at a rate higher than the input sample rate to clear the buffer.

An AGC unit within radio control unit 321 (FIG. 3) generates a signal SOP_boundary to indicate the start of packet boundary. The modem includes a master counter tsync_cnt kept in a register of a counter 535 that is triggered by the SOP_boundary signal and counts samples. Abovementioned U.S. patent application Ser. No. 60/322,382, titled AUTOMATIC GAIN CONTROL AND LOW POWER START-OF-PACKET DETECTION FOR A WIRELESS LAN RECEIVER to Ryan et al. and abovementioned U.S. patent application Ser. No. 60/354,344, titled AUTOMATIC GAIN CONTROL AND START-OF-PACKET DETECTION FOR A WIRELESS LAN RECEIVER to Ryan et al. describe embodiments of the AGC method and apparatus, and methods of generating SOP_boundary.

Synchronization is achieved by one or more methods such as estimating the short preamble's short symbol timing using a correlator and estimating the guard interval timing of the long preamble. The synchronization unit further includes frequency estimation and frequency correction using a rotator.

For the first 16 samples, the FIFO 507 output is unused. For the next 16 samples, synchronization unit 509 includes coarse frequency estimation and correction that requires that samples be delayed by a short symbol. Therefore the read address of the FIFO 507 is initialized 15 samples behind the write address. Synchronization unit 509 also includes fine frequency estimation that starts after coarse frequency estimation is complete, at tsync_cnt=31. In one embodiment, this requires that samples be delayed by two short symbols. A delay change is signaled to the FIFO 509 and the read address decreases by 15 instead of increasing by unity. Correct timing also is determined in synchronization unit 509 using one or more correlators that generate a pulse called corr_boundary when timing is determined. After fine frequency, the buffer output is not needed until the timing has been determined. The outcome of the timing estimation (corr_boundary) nominally appears 17 samples after the guard interval that occurs between the short and long preamble (see FIG. 4) is actually detected. The corr_boundary signal causes another delay change, and the read address of the FIFO is decreased by 45−31=14 instead of increasing by unity. This delay change compensates for the 15-sample latency in detecting the guard interval and making the change.

Accordingly, the first, second, third and so forth samples out of the FIFO after the delay change should be the first, second, third and so forth samples from the second half of GI2. This is true except for the first sample, since its address was calculated before the delay change.

These output samples are passed through a phase rotator in synchronization unit 509 that corrects the samples. The output of the rotator is presented to an input buffer 510 of an FFT unit 511 (FFT64) for time-to-frequency conversion.

Since no processing occurs until the FFT input buffer 510 is full, the transfer rate out of the FIFO may be increased at this point, e.g., doubled. This reduces the processing latency. Samples are read out of the FIFO into the FFT at a higher rate, e.g. at twice the rate that they are written into the FIFO, so that the FIFO is flushed or collapsed. The higher-rate flushing continues until the FIFO is empty, signaled by the write address matching the read address.

In this way, the FIFO introduces a temporary latency.

In one embodiment, the FFT process of unit 511 is started a settable number (called sof_offset) samples into a frame. In one embodiment, the processing of frames start halfway through the guard interval (16 samples before the start of the first long symbol) and three quarters of the way through the first long symbol (16 samples before the start of the second long symbol). Timing estimation in synchronization unit 509 signals the start of the long symbol frames by two pulses. The first is issued after sof_offset+5 samples; the second is issued another 64 samples later. The start of the signal frame is identified by a pulse data_start, which is generated by the synchronization unit 509 after a further 64 samples. In the case of all three pulses, the +5 term accounts for the delay introduced by the rotator.

The FFT64 block 511 in FIG. 5 transforms the complex baseband time-domain samples of the long training symbols of the preamble plus the data-carrying OFDM symbols of the received packet into complex frequency domain samples. Inputs to FFT64 are blocks of 64 complex samples of the received signal processed in natural time order. Outputs are blocks of 64 complex frequency samples in bit-reversed frequency order.

In one embodiment, described further below, the FFT64 block includes counting frames. The count of frames is maintained in a frame count register 533 whose value is called frame_cnt herein. frame_cnt is initially set to 0 prior to any packet frames being processed, and incremented each time a frame is processed by the FFT64 block 511.

In an IEEE802.11a compliant operation, 80 samples are transmitted per OFDM symbol. Intersymbol interference (ISI) due to signal dispersion in the channel and multi-path reception corrupts early samples in the received block of 80 samples. Delay spread due to multi-path reception typically has an exponential delay-time profile. Residual carrier frequency drift can be positive or negative. To provide good performance in the presence of these effects, the 64 samples selected from each received OFDM time-domain symbol are centered in the middle of the samples that are assumed to be relatively uncorrupted by ISI.

The IQ frequency domain samples from FFT64 511, in bit-reversed frequency order, are now input into a channel response estimation and correction block 513. Block 513 includes a rectangular-to-polar converter—a Cordic in one embodiment—to convert the IQ samples into polar coordinate form before being processed by channel response estimation circuits in block 513. Block 513 further includes channel equalization circuits, a null channel detection circuit, a pilot tone correction unit, and a second coordinate converter to convert the output from polar to rectangular coordinates. The output is thus a sequence of IQ frequency samples for demodulation by a demodulator 515.

A rate buffer block 514 is included before the samples are input into the demodulator. The rate buffer 514 is a second FIFO which buffers the received frequency samples from the end of the SYMBOL field for a number N of clock cycles, where N is the latency (in clock cycles) through the demodulator, deinterleaver, and Viterbi decoder of the modem for processing the SYMBOL field. The rate buffer block 514 is included because the SYMBOL field, which is always transmitted as rate 1/2 BPSK, determines the modulation type and coding rate of the remainder of the packet. This information is then used to set up the demodulator and Viterbi decoder parameters before the remainder of the packet is input into the demodulator chain. Hence, the remainder of the packet needs to be buffered until at least the RATE and DATARATE information has been successfully decoded.

One aspect of the invention is reducing the length of the rate buffer 514 by reducing the Viterbi decoder latency for processing the data in the SYMBOL field relative to the Viterbi processor latency for processing the remaining payload frames in the packet.

The demodulator 515 performs the opposite of the mappings performed during the modulation step. Initially, the demodulator is set to act as a BPSK demodulator to demodulate the SYMBOL field. Once the RATE and thus the modulation scheme are determined, the demodulator is set to demodulate the appropriate modulation scheme.

The demodulated symbols are de-interleaved by de-interleaver 517 that performs the opposite of the interleaving done by the transmitter. The \interleaving and thus the required de-interleaving depend on the rate, thus initially, it is assumed that the SYMBOL field (rate 1/2 BPSK) is being processed. Once the modulation scheme and coding rate of the remainder of the packet is determined, the RATE is set to the appropriate rate and the de-interleaver is set to perform its correct function.

In one embodiment, the output of de-interleaver 517 is a sequence of samples of both I and Q fed to a symbol inserter 519. The symbol inserter 519 inserts dummy symbols into the received bit stream to reconstruct the rate 3/4, 2/3, and 7/8 punctured codes to a rate-1/2 format suitable to the Viterbi decoder 521 of the modem embodiment of FIG. 3, which is a rate-1/2 Viterbi decoder. The symbol-insertion process is the opposite of the code puncturing process used in the transmitter. The inserted dummy symbols lie in the center of the received signal constellation so that they convey no statistical information to the Viterbi decoder.

The Viterbi decoder is described further in above mentioned incorporated herein by reference U.S. patent application Ser. No. 60/322,415 titled ADAPTIVE VITERBI DECODER FOR A WIRELESS DATA NETWORK RECEIVER. During processing of the SYMBOL field, the output of the Viterbi decoder is monitored by a PLCP header extractor 517 that extracts the RATE, DATARATE, and LENGTH headers. This information is decoded by a modulation, length, and rate decoder unit 529 to determine the RATE and modulation scheme, and also to calculate a measure called max_cnt herein of the expected length of the packet—as a number of frames in one embodiment. The modulation scheme information is fed to the demodulator 515 and the RATE information is fed to the de-interleaver and symbol-inserter units.

Once the payload comes out of the Viterbi decoder 521, its output is de-scrambled in descrambler unit 523 and converted to parallel form in serial-to-parallel converter 525 for transmission to the MAC unit.

After SYMBOL has been decoded and the information therein extracted and decoded, a completion flag—called h_done herein—is output by the decoder unit 529 to indicate when the decoding of the SYMBOL filed is complete.

The demodulator now starts to process the samples in the rate buffer corresponding to the data frames of the packet.

The measure of the expected length of the packet, max_cnt, is input from the decoder unit 529 to a comparison unit 531 that compares max_cnt with the running frame count frame_cnt. A completion flag—called h_done herein—also is output by the decoder unit 529 to indicate when the decoding of the SYMBOL filed is complete. The comparison unit 531 outputs an indication—called fast_flush herein—when the last sample of the packet has been input to the FIFO 507, so long as h_done is set.

The data arrives at the receive processing pipeline (e.g., into the down-converter) at a rate of 20Msamples/s ((IQ) samples). During reception of a packet the processing rate of the elements after the down-converter is thus limited to 20Msamples/s, else the processor would run out of data to operate on; the pipeline needs to be kept full. This is achieved by disabling three out of every four pulses of the 80 MHz clock. However, once the last symbol has been sampled at the receiver, one aspect of the invention is increasing the processing rate of the receiver processing elements so that pipeline latency is reduced.

Thus, after frame_cnt reaches a number that indicates that all the samples have been input into the FIFO 507, the flag fast_flush is set by the comparison unit 531; this flag in turn causes a clock enable circuit 541 of the circuit that provides a clock (the pipeline clock) for the receive processing chain to increase the pipeline clock signal from 20 MHz to a faster rate, 80 MHz in one embodiment.

Thus, the flag output of the comparison unit is input into a clock unit that provides a clock signal to the pipeline. The clock unit causes the receive processing pipeline to process the samples entering the pipeline at a first rate compatible with the input sample rate until the comparison unit flag output indicates that all samples have entered the pipeline. Thereafter the clock unit causes the processing pipeline to process the samples in the pipeline at a second rate higher than the first rate until the last sample of the packet has been output by the pipeline.

In an embodiment compatible with the IEEE 802.11a standard, the 80 MHz second rate enables the receive chain of FIG. 5 to meet the required 12 μs receive processing latency specified by the standard. The same number of processing cycles is performed, but the rate of carrying out the steps is increased.

The inventor has discovered that this method and apparatus for faster processing of the receive chain once the last packet sample has arrived has greatest effect for the low data rates, but also yields improvement at the higher 48 and 54 Mbps rates.

Note that in one embodiment, the pipeline latency in cycles is more than 100 cycles, due mainly to the Viterbi processor. One embodiment of reducing the processing latency of the Viterbi decoder is described in above-mentioned, incorporated herein by reference U.S. patent application Ser. No. 60/322,415.

Different embodiments use different methods of determining when the last sample has arrived at the receive chain. In one embodiment, the length of the packet expressed as a number of frames (i.e., symbols) is calculated from the LENGTH field and RATE fields. In another embodiment a total number of samples in the packet rather than a frame count is calculated from the LENGTH and DATA fields by the decoder 529 and used for comparison with a running data count. The running data count may be a sample count incremented in the sample counter 535 that counts tsync_cnt, or in a different sample counter. In yet another embodiment, a time count, e.g., in ns, is calculated from the LENGTH and DATA fields and used for comparison with a running time count.

Furthermore, while one embodiment increases the processing rate by a factor of four in the "fast-flush" mode after all the samples have been fed to the receive chain pipeline, other embodiments may use different fast-flush processing rates.

Thus, while some embodiments, contexts, and applications have been described herein, the invention is not limited to those embodiments, contexts, and applications.

Note that in the above description, many settable variables, flags, and tables have been described. These provide for flexibility. In one embodiment, these variables are loaded into the registers 137 in the receiver via the configuration port SPI. Different embodiments of the invention may have more or fewer such registers and corresponding settable parameters or flags.

While an embodiment has been described for processing OFDM packets, the invention may be embodied in receivers and receive signal processors for other types of packets.

While an embodiment for operation with RF frequencies in the 5 GHz range has been described, the invention may be embodied for operating at other RF frequency ranges. Furthermore, while an embodiment for operation conforming to the IEEE 802.11a standard has been described, the invention may be embodied in transceivers conforming to other IEEE standard that use OFDM, e.g., the IEEE 802.11g standard, and for other applications that require reducing decoding latency, including, for example, the IEEE 802.11b standard, other WLAN standards, bluetooth, GSM, PHS, and other cellular wireless telephony standards. Applications that can be accommodated by RF transceiver 400 are IEEE 802.11a COFDM wireless LANs and links, wireless Ethernet, Hiperlan I, Hiperlan II, European Technical Standards Institute (ETSI) broadband radio access network (BRAN), and multimedia mobile access communication (MMAC) systems, wireless local area networks, local multipoint distribution service (LMDS) IF strips, wireless digital video, wireless USB links, wireless IEEE 1394 links, TDMA packet radios, low-cost point-to-point links, voice-over-IP portable "cell phones" (wireless Internet telephones), etc.

Furthermore, while embodiments described herein are for an integrated circuit that includes MOS transistors, the invention is not restricted to MOS transistor circuits. Furthermore, while CMOS embodiments are described herein, the invention is not restricted to a CMOS integrated circuit.

Thus, while there has been described what is believed to be the preferred embodiments of the invention, those skilled in the art will recognize that other and further modifications may be made thereto without departing from the spirit of the invention, and it is intended to claim all such changes and modifications as fall within the scope of the invention.

What is claimed is:

1. A radio receiver for implementing the physical layer receiving function (PHY) of a wireless data network, the receiver including:
    a receiver front-end for receiving radio signals and including one or more analog-to-digital converters, the receiver front-end providing samples of a received packet of data;
    a receive processing pipeline coupled to the receiver front-end to process the provided samples of the received packet of data, the samples entering the receive processing pipeline at a first sample rate;

a counter counting a running count indicative of the number of samples that have entered the processing pipeline;

a comparison unit coupled to the counter for determining from the running count if all the samples of the received packet have entered the pipeline, having an output indicative of whether or not all samples have entered the pipeline; and a clock unit coupled to the comparison unit output and providing a clock signal to the pipeline, the clock unit causing the processing pipeline to process the samples entering the pipeline at a first rate compatible with the first sample rate until the comparison unit output indicates that all samples have entered the pipeline, thereafter the clock unit causing the processing pipeline to process the samples in the pipeline at a second rate higher than the first rate until the last sample of the packet has been output by the pipeline, such that the processing latency for processing the complete packet is reduced from the case of the processing pipeline processing the samples all at the first rate.

2. A radio receiver as recited in claim 1, wherein the receiver is for implementing the physical layer receiving function (PHY) of a wireless data network.

3. A receiver as recited in claim 2, wherein the wireless data network conforms to an IEEE 802.11 standard that uses COFDM.

4. A receiver as recited in claim 2, wherein the packet of data has a packet structure that includes one or more header frames containing information on the length of the packet, and wherein the receive processing chain includes a header detector to detect when the header has been processed and to provide a packet length indication to the comparison unit.

5. A receiver as recited in claim 2, wherein the counter counts frames.

6. A radio receiver comprising:

a receive processing pipeline for processing samples of a received packet of data, the samples entering the receive processing pipeline at a first sample rate, the pipeline including:

a FIFO buffer in the pipeline to receive the samples at the first sample rate; and a transformer in the pipeline with an input coupled to the output of the buffer for performing time-to-frequency conversion on a block of input samples to produce converted samples, the transformer including an input buffer of length at least the number of samples in the block, the transformer further producing an indication of when the transformer input buffer is full with a block of input samples for time-to-frequency conversion, wherein the samples are read out of the FIFO at a second rate higher than the first sample rate until the indication signals that the transformer input buffer is full with a block of samples or until the FIFO is empty in the case that the FIFO is empty before the input buffer contains the block of samples.

7. A radio receiver comprising:

a receive processing pipeline for processing samples of a received packet of data, the samples entering the receive processing pipeline at a first sample rate; and a clock generator to generate the clock signal for the receive processing pipeline to process samples at a first processing rate compatible with the first sample rate, the pipeline including:

a end of packet detector coupled to the clock generator to determine when and to output an indication of when all the samples of the packet of data have been input into the receive pipeline;

wherein the clock generator accepts the indication and in response the indication generates the clock signal for the receive processing pipeline to process samples at a second processing rate higher than the first processing rate until the last sample of the packet has been output by the pipeline.

8. A radio receiver as recited in claim 7, wherein the receiver is for implementing the physical layer receiving function (PHY) of a wireless data network.

9. A radio receiver as recited in claim 7, wherein the pipeline includes:

a FIFO buffer to receive the samples at the first sample rate; and a transformer in the pipeline with an input coupled to the output of the buffer for performing time-to-frequency conversion on a block of input samples to produce converted samples, the transformer including an input buffer of length at least the number of samples in the block, the transformer further producing an indication of when the transformer input buffer is full with a block of input samples for time-to-frequency conversion, wherein the samples are read out of the FIFO at a third rate higher than the first sample rate until the indication signals that the transformer input buffer is full with a block of samples or until the FIFO is empty in the case that the FIFO is empty before the input buffer contains the block of samples.

10. A radio receiver as recited in claim 8, wherein the wireless data network conforms to an IEEE 802.11 standard that uses COFDM.

11. A radio receiver as recited in claim 8, wherein the second rate is four times the first rate.

12. A radio receiver as recited in claim 8, wherein the packet of data has a packet structure that includes one or more header frames containing information on the length of the packet, and wherein the receive processing chain includes a header detector to detect when the header has been processed and to provide a packet length indication to the end-of-packet detector.

13. A radio receiver as recited in claim 12, further comprising:

a running counter coupled to the pipeline that counts the number of frames processed by the processing pipeline and provides the count to the end-of-packet detector.

14. A radio receiver as recited in claim 13, wherein the end-of-packet detector includes a comparator that compares the running count provided by the running counter with the packet length indication to generate a signal to the clock generator to start processing at the second rate.

15. A radio receiver as recited in claim 12, further including a running counter coupled to the pipeline that counts the number of samples processed by the processing pipeline and provides the running count to the end-of-packet detector.

16. A method for processing a packet of data samples received at a radio receiver, comprising the steps of:

accepting samples from the receiver for processing;

counting an indication of the number of samples accepted;

processing the accepted samples at a first rate;

determining the indication of length of the packet;

determining when all the samples of the packet have been accepted; and after all the samples of the packet have been accepted, processing any remaining samples at a second rate higher than the first rate.

17. A method as recited in claim 16, wherein the receiver and processing are for implementing the physical layer receiving function (PHY) of a wireless data network.

18. A method as recited in claim 17, wherein the wireless data network conforms to an IEEE 802.11 standard that uses COFDM.

19. A method as recited in claim 17, wherein the second rate is four times the first rate.

20. A method as recited in claim 17, wherein the packet of data has a packet structure that includes one or more header frames containing information on the length of the packet, and wherein determining the packet length indication includes decoding the one or more header frames.

21. A method as recited in claim 20, wherein the counting counts the number of frames processed, and wherein determining when all the samples of the packet have been accepted includes comparing the count to the determined packet length indication.

22. A method as recited in claim 20, wherein the counting counts the number of samples processed, and wherein determining when all the samples of the packet have been accepted includes comparing the count to the determined packet length indication.

23. An apparatus for processing a packet of data samples received at a radio receiver, comprising the steps of:
   means for accepting samples from the receiver for processing;
   means for counting an indication of the number of samples accepted;
   means for processing the accepted samples;
   means for determining an indication of length of the packet;
   means for determining when all the samples of the packet have been accepted; and wherein the means for processing the accepted samples processes the accepted samples at a first rate until all the samples of the packet have been accepted, and thereafter, processing any remaining samples at a second rate higher than the first rate.

24. An apparatus as recited in claim 23, wherein the receiver and processing are for implementing the physical layer receiving function (PHY) of a wireless data network.

25. An apparatus as recited in claim 24, wherein the wireless data network conforms to an IEEE 802.11 standard that uses COFDM.

26. An apparatus as recited in claim 24, wherein the second rate is four times the first rate.

27. An apparatus as recited in claim 24, wherein the packet of data has a packet structure that includes one or more header frames containing information on the length of the packet, and wherein determining the packet length indication includes decoding the one or more header frames.

28. An apparatus as recited in claim 27, wherein the means for counting counts the number of frames processed, and wherein the means for determining when all the samples of the packet have been accepted includes comparing the count to the determined packet length indication.

29. An apparatus as recited in claim 27, wherein the means for counting counts the number of samples processed, and wherein the means for determining when all the samples of the packet have been accepted includes comparing the count to the determined packet length indication.

* * * * *

UNITED STATES PATENT AND TRADEMARK OFFICE
CERTIFICATE OF CORRECTION

PATENT NO. : 7,065,036 B1 Page 1 of 1
APPLICATION NO. : 10/096010
DATED : June 20, 2006
INVENTOR(S) : Ryan It is certified that error appears in the above-identified patent and that said Letters Patent is hereby corrected as shown below:

On the title page item (54) and col. 1, line 1, change the title from "METHOD AND APPARATUS TO REDUCE LATENCY IN A DATA NETWORK WIRELESS RADIO RECEIVER" to -- METHOD AND APPARATUS TO REDUCE PROCESSING LATENCY IN A WIRELESS DATA NETWORK RECEIVER--

Signed and Sealed this

Nineteenth Day of June, 2007

JON W. DUDAS
*Director of the United States Patent and Trademark Office*